US012675703B2

(12) United States Patent
Dumpala et al.

(10) Patent No.: US 12,675,703 B2
(45) Date of Patent: Jul. 7, 2026

(54) MULTI-MODAL ARTIFICAL NEURAL NETWORK AND A SELF-SUPERVISED LEARNING METHOD FOR TRAINING SAME

(71) Applicant: Royal Bank of Canada, Toronto (CA)

(72) Inventors: Sri Harsha Dumpala, Toronto (CA); Ainaz Hajimoradlou, Vancouver (CA); Amir Abdi, Vancouver (CA); Leila Pishdad, Toronto (CA); Maryna Karpusha, Vancouver (CA); Pablo Hernandez, Toronto (CA)

(73) Assignee: Royal Bank of Canada, Toronto (CA)

( * ) Notice: Subject to any disclaimer, the term of this patent is extended or adjusted under 35 U.S.C. 154(b) by 671 days.

(21) Appl. No.: 18/179,214

(22) Filed: Mar. 6, 2023

(65) Prior Publication Data

US 2023/0281456 A1      Sep. 7, 2023

Related U.S. Application Data

(60) Provisional application No. 63/317,074, filed on Mar. 6, 2022.

(51) Int. Cl.
*G06N 3/088*          (2023.01)
*G06F 18/241*          (2023.01)
(Continued)

(52) U.S. Cl.
CPC ............. *G06N 3/088* (2013.01); *G06N 3/045* (2023.01); *G06F 18/241* (2023.01); *G06N 3/02* (2013.01);
(Continued)

(58) Field of Classification Search
CPC ...... G06N 3/088; G06N 3/045; G06N 3/0895; G06N 3/084; G06N 20/00; G06N 3/0455;
(Continued)

(56) References Cited

U.S. PATENT DOCUMENTS

2021/0124985  A1 *   4/2021   Ren ........................... G06N 3/09
2021/0398183  A1 *   12/2021  Jain ........................ G06V 10/82

OTHER PUBLICATIONS

Xinlei Chen and Kaiming He. Exploring simple siamese representation learning. In Proceedings of the IEEE/CVF Conference on Computer Vision and Pattern Recognition, pp. 15750-15758, 2021.
(Continued)

*Primary Examiner* — Quoc A Tran

(57) ABSTRACT

A multi-modal artificial neural network and a self-supervised learning method for training that network. The learning method involves processing, using a first modality simple Siamese network, a pair of first modality augmented views of an input; processing, using a second modality simple Siamese network, a pair of second modality augmented views of the input; determining at least one cross-modal loss between the first and second modality simple Siamese networks; determining a total loss from: (i) first and second modality losses respectively determined during the processing using the first and second modality simple Siamese networks; and (ii) the at least one cross-modal loss; and training the first and second modality simple Siamese networks based on the total loss. The trained network may be used to analyze multi-modal content such as video content that has an audio track. A Multi-Modal Multi-Head Network (M3HN) may also be trained to process modality-specific and modality-agnostic representations.

16 Claims, 5 Drawing Sheets

(51) Int. Cl.

| | |
|---|---|
| *G06N 3/02* | (2006.01) |
| *G06N 3/045* | (2023.01) |
| *G06N 3/0455* | (2023.01) |
| *G06N 3/08* | (2023.01) |
| *G06N 3/084* | (2023.01) |
| *G06N 3/0895* | (2023.01) |
| *G06N 20/00* | (2019.01) |
| *G06V 10/82* | (2022.01) |

(52) U.S. Cl.
  CPC ............. *G06N 3/0455* (2023.01); *G06N 3/08* (2013.01); *G06N 3/084* (2013.01); *G06N 3/0895* (2023.01); *G06N 20/00* (2019.01); *G06T 2207/20084* (2013.01); *G06V 10/82* (2022.01)

(58) Field of Classification Search
  CPC ............ G06N 3/02; G06T 2207/20084; G06F 18/241; G06V 10/82
  See application file for complete search history.

(56) References Cited

OTHER PUBLICATIONS

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Du Tran, Heng Wang, Lorenzo Torresani, Jamie Ray, Yann LeCun, and Manohar Paluri. A closer look at spatiotemporal convolutions for action recognition. In Proceedings of the IEEE conference on Computer Vision and Pattern Recognition, pp. 6450-6459, 2018.

Saining Xie, Chen Sun, Jonathan Huang, Zhuowen Tu, and Kevin Murphy. Rethinking spatiotemporal feature learning: Speed-accuracy trade-offs in video classification. In Proceedings of the European conference on computer vision (ECCV), pp. 305-321, 2018.

Joon Son Chung, Arsha Nagrani, and Andrew Zisserman. Voxceleb2: Deep speaker recognition. arXiv preprint arXiv:1806.05622, 2018.

Mandela Patrick, Yuki M Asano, Polina Kuznetsova, Ruth Fong, João F Henriques, Geoffrey Zweig, and Andrea Vedaldi. On compositions of transformations in contrastive self-supervised learning. In Proceedings of the IEEE/CVF International Conference on Computer Vision, pp. 9577-9587, 2021.

Jean-Baptiste Alayrac, Adria Recasens, Rosalia Schneider, Relja Arandjelovic, Jason Ramapuram, Jeffrey De Fauw, Lucas Smaira, Sander Dieleman, and Andrew Zisserman. Self-supervised multimodal versatile networks. NeurIPS, 2(6):7, 2020.

Alexei Baevski, Steffen Schneider, and Michael Auli. vq-wav2vec: Self-supervised learning of discrete speech representations. In International Conference on Learning Representations, 2019.

Andy T Liu, Shu-wen Yang, Po-Han Chi, Po-chun Hsu, and Hung-yi Lee. Mockingjay: Unsupervised speech representation learning with deep bidirectional transformer encoders. In ICASSP 2020-2020 IEEE International Conference on Acoustics, Speech and Signal Processing (ICASSP), pp. 6419-6423. IEEE, 2020.

Alexei Baevski, Yuhao Zhou, Abdelrahman Mohamed, and Michael Auli. wav2vec 2.0: A framework for self-supervised learning of speech representations. Advances in Neural Information Processing Systems, 34, 2020.

Joao Carreira and Andrew Zisserman. Quo vadis, action recognition? a new model and the kinetics dataset. In proceedings of the IEEE Conference on Computer Vision and Pattern Recognition, pp. 6299-6308, 2017.

Steven R Livingstone and Frank A Russo. The ryerson audio-visual database of emotional speech and song (ravdess): A dynamic, multi-modal set of facial and vocal expressions in north american english. PloS one, 13(5):e0196391, 2018.

Humam Alwassel, Dhruv Mahajan, Bruno Korbar, Lorenzo Torresani, Bernard Ghanem, and Du Tran. Self-supervised learning by cross-modal audio-video clustering. In 34th Conference on Neural Information Processing Systems (NeurIPS 2020). NeurIPS, 2020.

Amir Zadeh, Paul Pu Liang, Jonathan Vanbriesen, Soujanya Poria, Edmund Tong, Erik Cambria, Minghai Chen, Louis-Philippe Morency. Multi-modal language analysis in the wild: Cmu-mosei dataset and interpretable dynamic fusion graph. In Proceedings of the 56th Annual Meeting of the Association for Computational Linguistics (vol. 1: Long Papers), pp. 2236-2246, 2018.

Santiago Castro, Devamanyu Hazarika, Verónica Pérez-Rosas, Roger Zimmermann, Rada Mihalcea, and Soujanya Poria. Towards multimodal sarcasm detection (an _obviously_ perfect paper). arXiv preprint arXiv: 1906.01815, 2019.

Sergey Ioffe and Christian Szegedy. Batch normalization: Accelerating deep network training by reducing internal covariate shift. In International conference on machine learning, pp. 448-456. PMLR, 2015.

Jonathan Gratch, Ron Artstein, Gale M Lucas, Giota Stratou, Stefan Scherer, Angela Nazarian, Rachel Wood, Jill Boberg, David DeVault, Stacy Marsella, et al. The distress analysis interview corpus of human and computer interviews. In LREC, pp. 3123-3128, 2014.

* cited by examiner

100

500

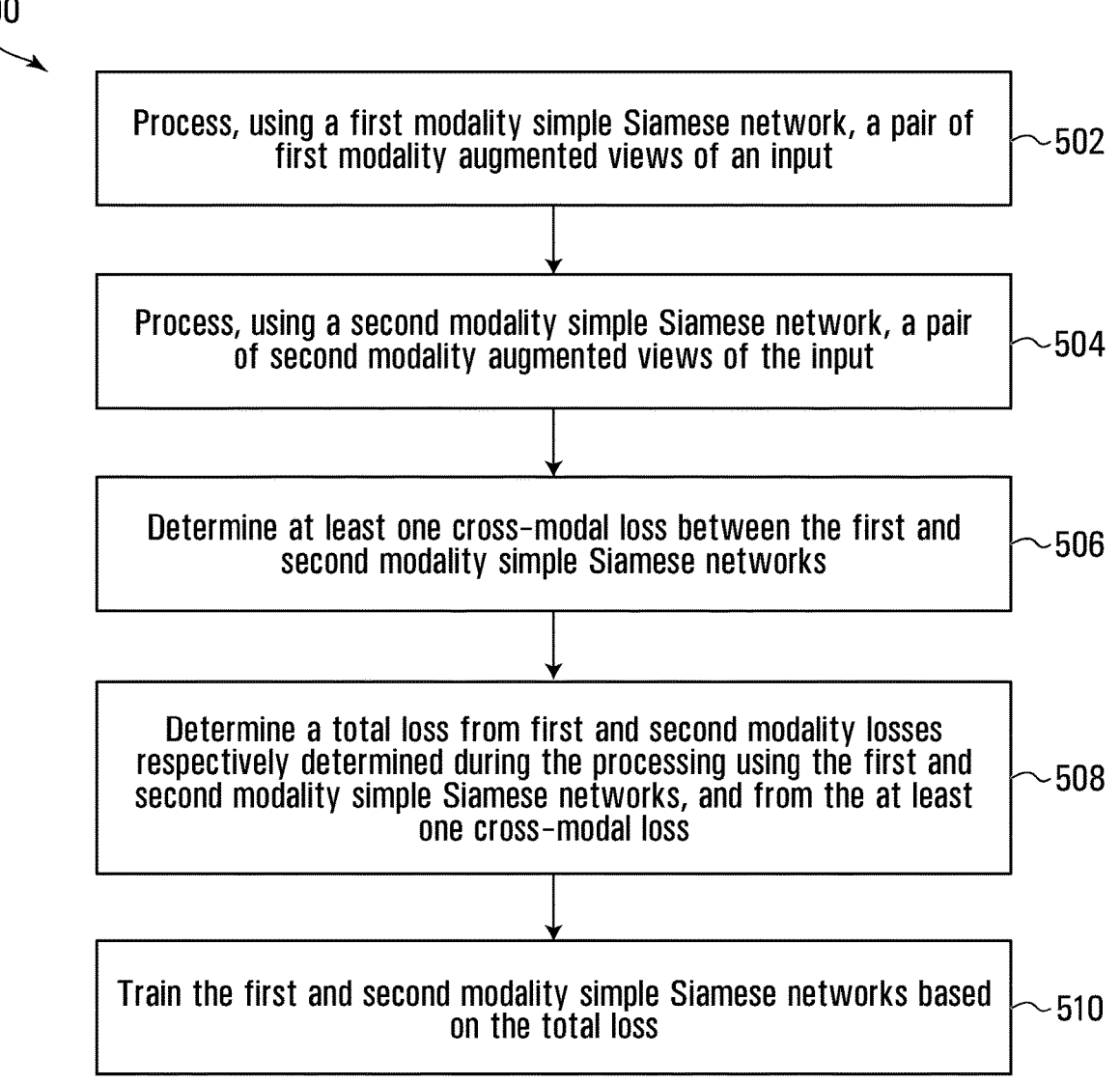

Process, using a first modality simple Siamese network, a pair of first modality augmented views of an input ~502

Process, using a second modality simple Siamese network, a pair of second modality augmented views of the input ~504

Determine at least one cross-modal loss between the first and second modality simple Siamese networks ~506

Determine a total loss from first and second modality losses respectively determined during the processing using the first and second modality simple Siamese networks, and from the at least one cross-modal loss ~508

Train the first and second modality simple Siamese networks based on the total loss ~510

FIG. 5

MULTI-MODAL ARTIFICAL NEURAL NETWORK AND A SELF-SUPERVISED LEARNING METHOD FOR TRAINING SAME

CROSS-REFERENCE TO RELATED APPLICATION

The present application claims priority to U.S. provisional patent application No. 63/317,074 filed on Mar. 6, 2022, and entitled "Multi-modal Artificial Neural Network and a Self-Supervised Learning Method for Training Same".

TECHNICAL FIELD

The present disclosure is directed at a multi-modal artificial neural network, and a self-supervised learning method for training that network.

BACKGROUND

Self-supervised learning (SSL), also referred to as unsupervised representation learning, aims at obtaining features without using manual annotations. In recent times, various SSL frameworks have been proposed. These frameworks can generally be classified as contrastive learning frameworks, clustering frameworks, and non-contrastive learning frameworks.

Neural networks for self-supervised learning are often trained on raw data using manually specified pretext tasks for supervision to achieve representations which can be used for downstream tasks. Pretext tasks such as spatial patch prediction, image rotation prediction, future frame prediction, speed prediction, sorting video clips, video-audio correspondence, cross-modality clustering, and sequence unmasking have been proposed for image, audio, text and video SSL.

SUMMARY

According to a first aspect, there is provided a self-supervised learning method comprising: (a) processing, using a first modality simple Siamese network, a pair of first modality augmented views of an input; processing, using a second modality simple Siamese network, a pair of second modality augmented views of the input; determining at least one cross-modal loss between the first and second modality simple Siamese networks; determining a total loss from: (i) first and second modality losses respectively determined during the processing using the first and second modality simple Siamese networks; and (ii) the at least one cross-modal loss; and training the first and second modality simple Siamese networks based on the total loss. Determining the at least one cross-modal loss may comprise determining a cross-modal loss based on: an output of a modality-agnostic projector of the first modality simple Siamese network that processes one of the first modality augmented views; and an output of a modality-agnostic projector of the second modality simple Siamese network that processes one of the second modality augmented views. A gradient may be back propagated to each of the modality-agnostic projectors, and a stop-gradient may be applied to respective encoders of the first and second Siamese networks, wherein the outputs of the encoders of the first and second Siamese networks are respectively input to the modality-agnostic projector of the first and second Siamese networks.

The input may comprise a video, the first modality may comprise images from the video, and the second modality may comprise audio from the video.

Predictors of the first and second modality simple Siamese networks may share weights.

The encoders of the first and second Siamese networks may comprise second and third encoders. The first modality simple Siamese network may comprise: a first encoder and the second encoder that respectively process the pair of first modality augmented views; and a first modality-specific projector and a second modality-specific projector that respectively receive an output of the first encoder and the output of the second encoder. The second modality simple Siamese network may comprise: the third encoder and a fourth encoder that respectively process the pair of second modality augmented views; and a third modality-specific projector and a fourth modality-specific projector that respectively receive the output of the third encoder and an output of the fourth encoder.

At least one of the i) first and second or ii) third and fourth modality-specific projectors may share weights.

The first and second encoders may share weights, and the third and fourth encoders may share weights.

The first, second, third, and fourth modality-specific projectors may share weights.

The first modality-agnostic projector may comprise a first network of convolutional layers whose output is input to a projector identical to the first or second modality-specific projector, and the second modality-agnostic projector may comprise a second network of convolutional layers whose output is input to a projector identical to the third or fourth modality-specific projector.

The augmented views of the video may be generated by performing at least one of random cropping, random rotation, random colorization, temporal shifting, random masking, or random shuffling.

The augmented views of the audio may be generated by performing at least one of adding additive white Gaussian noise, temporal shifting, random masking, random shuffling, or adding random silences.

According to another aspect, there is provided an artificial neural network trained in accordance with any of the foregoing aspects of the method or suitable combinations thereof.

According to another aspect, there is provided an artificial neural network comprising at least two heads, wherein one of the at least two heads is for processing a modality-specific representation of the input and another of the two heads is for processing a modality-agnostic representation of the input.

According to another aspect, there is provided use of the artificial neural network trained in accordance with any of the foregoing aspects of the method or suitable combinations thereof to process multi-modal data.

The multimodal data may comprise video data having an audio track.

The multimodal data may comprise financial data. For instance, the financial data may comprise data collected in respect of the same individual through different sources such as credit history, debit history, personal and business loans, and other banking transactions, with the different types of data representing different modalities.

According to another aspect, there is provided a system comprising: a processor; a database storing a multi-modal dataset that is communicatively coupled to the processor; and a memory that is communicatively coupled to the processor and that has stored thereon computer program code that is executable by the processor and that, when executed by the processor, causes the processor to retrieve the multi-modal dataset from the database and to use the multi-modal dataset to perform any of the foregoing aspects of the method or suitable combinations thereof.

According to another aspect, there is provided a non-transitory computer readable medium having stored thereon computer program code that is executable by a processor and that, when executed by the processor, causes the processor to train an artificial neural network according to any of the foregoing aspects of the method or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 5 is a method for training a multi-modal artificial neural network, according to an example embodiment.

DETAILED DESCRIPTION

In the present disclosure, the use of simple Siamese (SimSiam) representation learning [1], a non-contrastive representation learning framework, in connection with multi-modal input such as videos that include audio content is discussed.

Videos naturally comprise multiple modalities such as visual (sequence of images), audio, and textual (e.g., a transcript of words spoken on the video). Representations based on audio, visual, and text modalities have been used for video action recognition. Most multi-modal SSL techniques for videos learn a representation which is invariant to all of the video modalities, namely, visual, audio, and text. Such embedding may not be able to fully capture modality-specific information.

Figure 3:
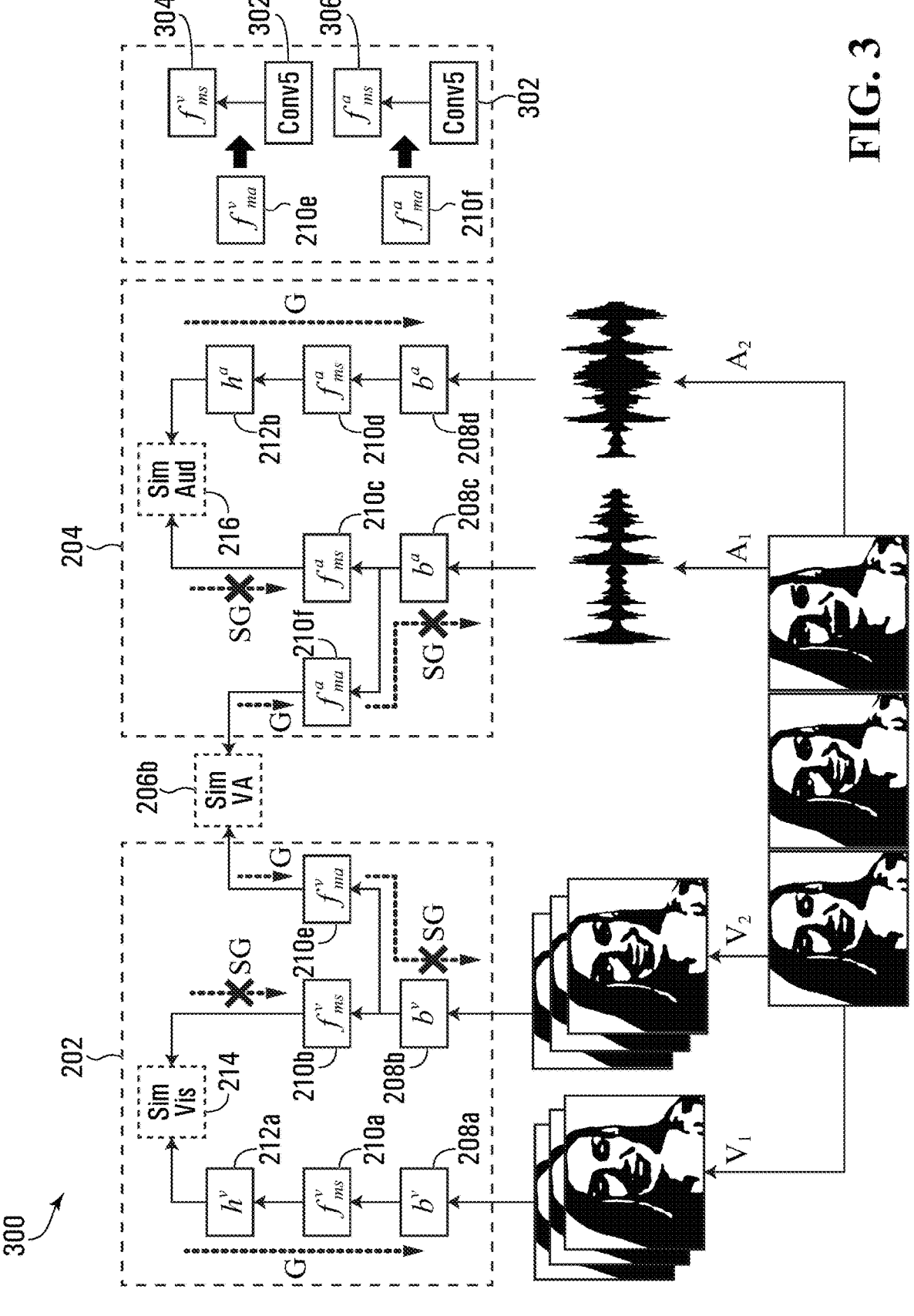
FIG. 3 depicts a multi-modal multi-head artificial neural network being used in conjunction with video content, according to an example embodiment.

In contrast, in at least some of the embodiments described herein, a Multi-Modal Multi-Head Network (M3HN) for video representation learning is provided to learn modality-specific and modality-agnostic representations for a given video input. Modality-specific representations are representations which are invariant to different augmentations applied to a particular modality while the modality-agnostic representations are representations which are invariant to different augmentations across different modalities. In a particular example embodiment, the M3HN is a multi-head network with shared backbone for each modality where one head is to generate a modality-specific representation while the other heads are to generate modality-agnostic representations; while the M3HN described below in respect of FIG. 3 is a two-headed network, in at least some other embodiments the network may have more than two heads. A SimSiam representation learning framework is used for multi-modal video representation learning. The M3HN has some similarities with Leave-one-out Contrastive Learning (LooC), a self-supervised learning technique for multi-augmentation representation learning. LooC projects the representations of the input image into several embedding spaces, each of which is variant to a certain augmentation while remaining invariant to other augmentations. Unlike LooC, M3HN learns modality-variant and modality-invariant representations for multi-modal data. Moreover, LooC follows a Momentum contrast approach, whereas M3HN applies SimSiam.

The M3HN as described herein applies self-supervised learning to perform the task of affective video content analysis. Affective video content analysis, i.e., recognizing emotions, facial expressions and other paralinguistic content is understudied and a nascent research problem. The performance of the M3HN herein may be assessed on a set of downstream tasks related to affective video content analysis.

The applications of the M3HN herein extend to domains such as financial data analysis, video analysis, entertainment, etc. For instance, in financial data analysis, data collected from the same individual through different sources such as credit history, debit history, personal and business loans and other banking transactions is available, with the different types of data representing different modalities. Each source carries two types of information i.e., information specific to a particular source, and information agnostic to all other sources. A self-supervised learning approach to learn representations is described herein that can convey both the source specific and source agnostic information.

More particularly, the present disclosure describes the following:

1. A SimSiam-based framework for multi-modal self-supervised learning using multimodal data such as videos. In contrast to relying on frameworks such as simple contrastive learning and bootstrapping your own latent (BYOL), the present disclosure describes extending the SimSiam framework for multi-modal video representation learning.

2. Multi-head networks: An "M3HN" architecture which comprises multiple heads to learn modality-specific and modality-agnostic representations. The M3HN with multiple heads may be used to perform downstream tasks related to affective video content analysis.

3. Pre-training on videos for affective content analysis: Previous works on multi-modal self-supervised learning on videos mainly focused on the task of video action recognition. In contrast, the present disclosure focuses in at least some embodiments on the task of affective video content analysis. Experiments to analyze the importance of combining visual and acoustic cues for various downstream tasks such as emotion recognition, sentiment analysis, and depression detection are described.

SimSiam Networks

Figure 1:
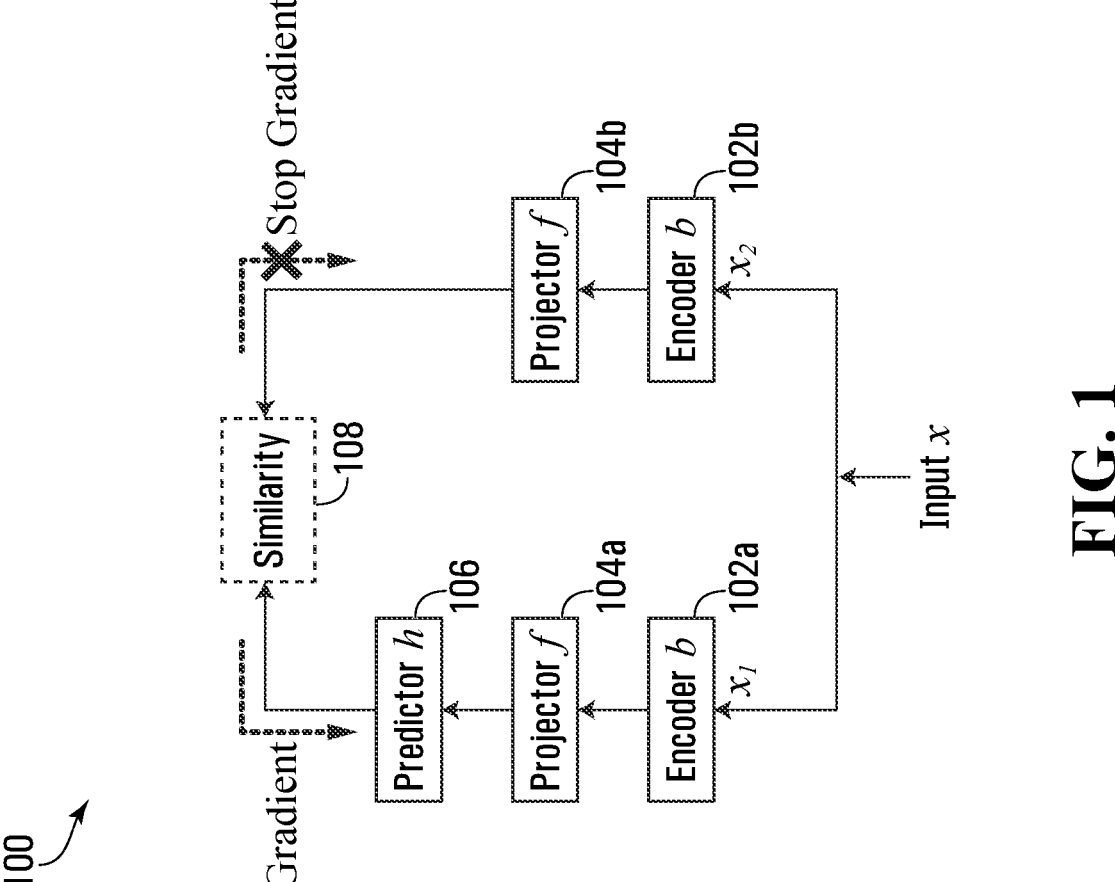
FIG. 1 depicts an example simple Siamese neural network, according to the prior art.

FIG. 1 depicts an example SimSiam network 100 for image representation learning. In FIG. 1, two augmented views of an input x, $x_1$ and $x_2$, are respectively processed by first and second encoder networks b (each an "encoder") 102a,b. The outputs of the first and second encoders 102a,b are respectively processed by first and second projector f networks (each a "projector") 104a,b. Then, a predictor network h ("predictor") 106 is applied on one side of the SimSiam network 100 and a stop-gradient operation is applied on the other side.

More particularly, the main components of the SimSiam network 100 are the first and second encoders 102a,b, first and second projectors 104a,b, and the predictor 106 that operates on the output of the first projector 104a. Given an input x, two randomly augmented views ($x_1$ and $x_2$) of the input x are generated. These two views are processed by the same backbone comprising the first and second encoders 102a,b (e.g., ResNet [2]), and subsequently processed by the first and second projectors 104a,b in the form of a projection MLP head network. Then the view output by the first projector 104a is processed by the predictor 106 and a stop-gradient is applied on the other view. Let the output of the predictor 106 for one view be $p_1=h(f(b(x_1)))$, and the output of the projector 104b for the other view be $z_2=f(b(x_2))$. Then the network 100 is trained by reducing and ideally minimizing a loss function; in this example, the negative cosine similarity 108 between the two outputs $p_1$ and $z_2$ which is defined as follows is minimized:

$$D(p_1, z_2) = -\frac{p_1}{\|p_1\|_2} \cdot \frac{z_2}{\|z_2\|_2}, \qquad (1)$$

where $\|\cdot\|_2$ refers to the $l_2$-norm.

A stop-gradient (stopgrad) is applied on one view: i.e., $D(p_1,\text{stopgrad}(z_2))$. To have a symmetric loss as defined in [1], Equation 1 gets modified as:

$$L=D(p_1,\text{stopgrad}(z_2))+D(p_2,\text{stopgrad}(z_1)). \qquad (2)$$

The weights used for the first and second encoders 102a,b may be identical, and additionally or alternatively the weights used in the first and second predictors 106 may be identical. Additionally, while FIG. 1 shows the first and second encoders and first and second projectors 104a,b, a single projector and/or encoder may be used and $x_1$ and $x_2$ may be processed sequentially using the same encoder and projector as opposed to in parallel as shown in FIG. 1.

Figure 2:
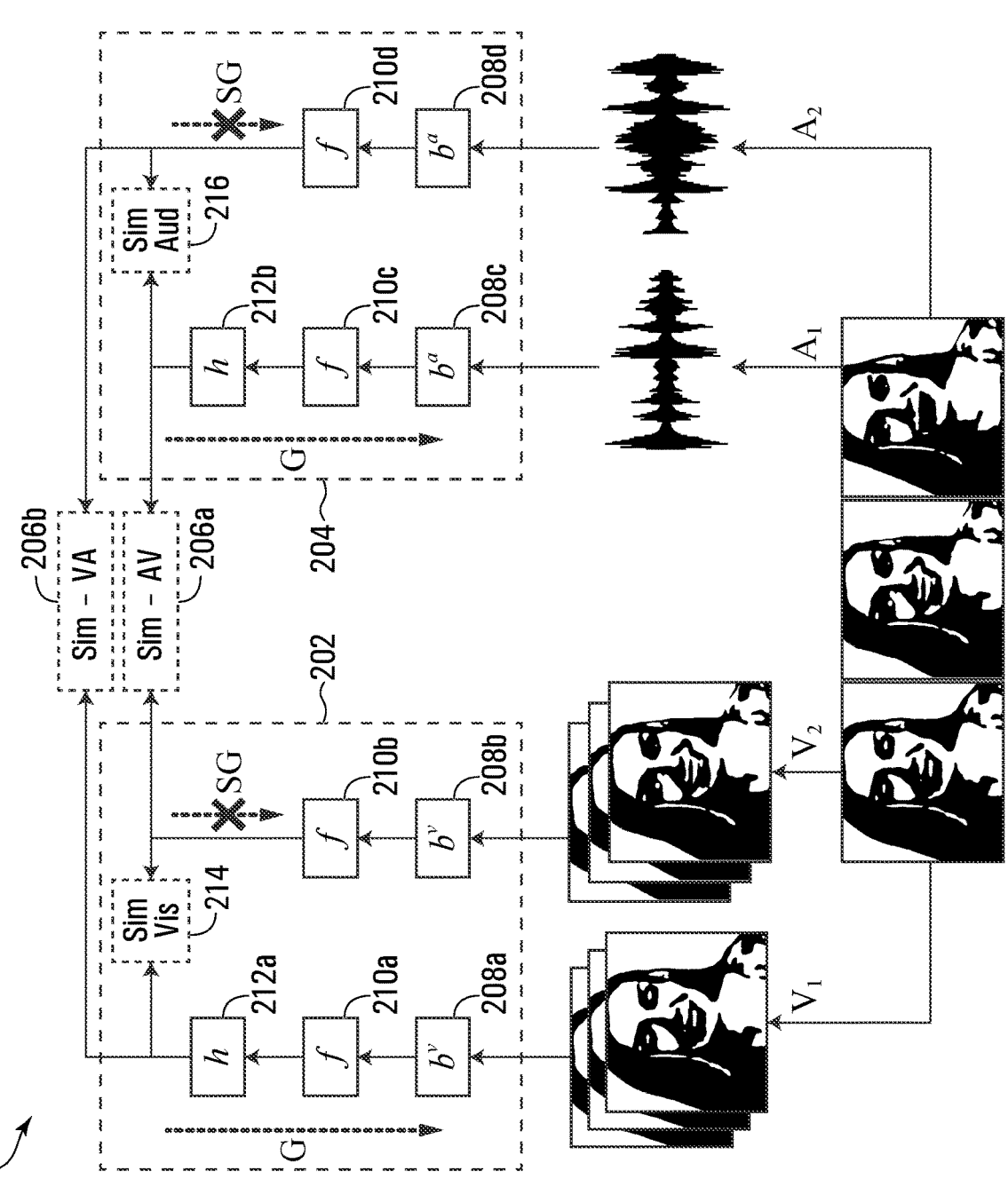
FIG. 2 depicts a multi-modal artificial neural network being used in conjunction with video content, according to an example embodiment.

SimSiam Network Extended to Multi-Modal Video Representation Learning and for Multi-Head Video Representation Learning FIG. 2 depicts an artificial multi-modal neural network 200 based on a SimSiam network for videos. The network 200 comprises separate SimSiam blocks for the visual modality and the audio modality. Given a video sample consisting of the visual and the audio modalities, the visual modality is processed by the visual SimSiam block and the audio modality is processed by the audio SimSiam block. More particularly, the network 200 comprises a first SimSiam network 202 for the visual modality ("visual modality network") and a second SimSiam network 204 for the audio modality ("audio modality network"). For each modality (visual and audio), two random augmented views ($V_1$, $V_2$ for video and $A_1$, $A_2$ for audio) are generated. The two augmented views of the visual modality are respectively processed by first and second encoders $b^v$ 208a,b and first and second projectors f 210a,b. One of the views is processed by a first predictor h 212 and the visual modality network 202 is trained to reduce and ideally minimize visual modal loss; in this example, to maximize the cosine similarity ("Sim Vis") 214 with the output of the projector f 210b for the other view. The gradient is back propagated for one view and a stop-gradient is applied on the other view. Similarly, the two augmented views of the audio modality are respectively processed by third and fourth encoders $b^a$ 208c,d and third and fourth projectors f 210c,d. One of the views is processed by a second predictor h 212b and the audio modality network 204 is trained to reduce and ideally minimize audio modal loss; in this example, to maximize the cosine similarity ("Sim Aud") 216 with the output of the projector f 210d for the other view. The gradient is back propagated for one view and a stop-gradient is applied on the other view. Cross-modal losses comprise a similarity loss ("Sim-VA loss") 206a determined using a first cross-modal loss module from the output of the first predictor 212a from the visual modality network 212a and the fourth projector 210d from the audio modality network 210d, and a similarity loss ("Sim-AV loss") 206b determined using a second cross-modal loss module from the output of the second projector 210b and second predictor 212b. The Sim-VA loss 206a is back propagated through the visual modality network 202 and a stop-gradient is applied on the audio modality network 204. Similarly, the Sim-AV loss 206b is back propagated through the audio modality network 204 and a stop-gradient is applied on the visual modality network 202. In FIG. 2, the first and second encoders 208a,b share weights; the third and fourth encoders 208c,d share weights; the first through fourth projectors 210a-d share weights; and the two predictors 212a,b share weights; this permits $V_1$, $V_2$, $A_1$, and $A_2$ to be processed in parallel. In alternative embodiments (not depicted) fewer instances of the encoders 208a-d, projectors 210a-d, and predictors 212a,b may be used if data is to be processed serially. For example, an alternative embodiment of the network 200 may use one or both of the encoders $b^v$ 208a,b, one or both of the encoders $b^a$ 208c,d, one or more of the projectors f 210a-d, and one or both of the predictors h 212a,b.

Referring now to FIG. 3, there is depicted an example M3HN 300, according to an example embodiment. Having multiple heads, the network 300 is able to learn modality-specific and modality-agnostic representations for each modality in a multi-modal dataset comprising different modalities. In the example embodiment described below, for case of understanding, videos comprising two different modalities (i.e., visual modality and audio modality→N=2) are described; however, different embodiments (not depicted) may comprise more than two modalities and use data other than videos.

In FIG. 3, visual and audio modalities of video are processed by two separate networks. For each modality (visual and audio), two random augmented views ($V_1$, $V_2$ for video and $A_1$, $A_2$ for audio) are generated. Both augmented views of a modality (e.g., $V_1$, $V_2$) are processed by the same encoder network. Two views ($V_1$, $V_2$) of a modality are processed by one projector and the second view ($V_2$) by another projector. The predictor is applied on $V_1$ and a stop-gradient on $V_2$. The second projector of each modality is trained to maximize the similarity (i.e., to minimize the loss) between Ve and $A_2$.

More particularly, analogous to the network 200 of FIG. 2, the M3HN 300 comprises the visual modality network 202 and the audio modality network 204. More particularly, the two augmented views of the visual modality are respectively processed by the first and second encoders $b^v$ 208a,b and first and second projectors $$f_{ms}^v$$

210a,b. One of the views is processed by a first predictor $h^v$ 212 and the visual modality network 202 is trained to reduce and ideally minimize the visual modal loss; in this example, to maximize the cosine similarity ("Sim Vis") 214 with the output of the projector $$f^v_{ms}$$

210*b* for the other view. The gradient is back propagated for one view and a stop-gradient is applied on the other view. Similarly, the two augmented views of the audio modality are respectively processed by the third and fourth encoders b$^a$ 208*c,d* and third and fourth projectors $$f^a_{ms}$$

210*c,d*. One the views is processed by a second predictor h$^a$ 212*b* and the audio modality network 204 is trained to reduce and ideally minimize the audio modal loss; in this example, to maximize the cosine similarity ("Sim Aud") 216 with the output of the projector $$f^a_{ms}$$

210*d* for the other view. The gradient is back propagated for one view and a stop-gradient is applied on the other view.

The cross-modal loss in FIG. 3 is the Sim-VA loss 206*b* determined by reducing and ideally minimizing the loss between the output of a fifth projector $$f^v_{ma}$$

210*e* that receives as input the output of the second encoder b$^v$ 208*b*, and the output of a sixth projector $$f^a_{ma}$$

210*f* that receives as input the output of the third encoder b$^a$ 208*c*. The gradient is back propagated to each of the fifth projector $$f^v_{ma}$$

210*e* and the sixth projector $$f^a_{ma},$$

and a stop-gradient is applied to each of the second encoder b$^v$ 208*b* and the third encoder b$^v$ 208*c*. As shown in FIG. 3, the fifth projector $$f^v_{ma}$$

210*e* comprises a network of five convolutional layers 302 (a "Conv5 network") together whose outputs is the input to a projector $$f^v_{ms}$$

304 identical to the first or second projectors $$f^v_{ms}$$

210*a,b*, while the sixth projector $$f^a_{ma}$$

210*f* comprises a Conv5 network 302 whose output is the input to a projector $$f^a_{ms}$$

306 identical to the third or fourth projectors $$f^a_{ms}$$

210*c,d*. For the M3HN 300, a projector other than $$f^v_{ms}$$

or $$f^a_{ms}$$

may be used in conjunction with the Conv5 network 302, and networks other than the Conv5 network 302 such as feedforward layers or recurrent layers may be used. In at least some embodiments, $$f^v_{ms}$$

and $$f^a_{ms}$$

are identical;

$$f^a_{ma}$$

and $$f_{ma}^v$$

have different weights and accordingly are not identical; and $h^v$ and $h^a$ are identical. Additionally, in FIG. 3

$$f_{ms}^v$$

differs from $$f_{ms}^a$$

berceuse different output representations are generated from $$f_{ms}^v$$

and $$f_{ma}^v,$$

and $$f_{ma}^a$$

differs from $$f_{ms}^a$$

berceuse different output representations are generated from $$f_{ma}^a$$

and $$f_{ms}^a.$$

The additional Conv5 network 302 in $$f_{ma}^v$$

and $$f_{ma}^a$$

achieves this in FIG. 3.

A detailed explanation of the pre-training approach depicted in FIG. 3 follows:

1. Given a video sample consisting of two different modalities i.e., visual and audio modalities in FIG. 3, generate two random augmented views each for the visual modality ($V_1$, $V_2$) and the audio modality ($A_1$, $A_2$).

2. A network block for each modality (the visual modality network 202 for the visual modality and the audio modality network 204 for the audio modality) comprises an encoder ($b^v$ for visual modality, and $b^a$ for audio modality), a pair of projectors $$(f_{ms}^v$$

and $$f_{ma}^v$$

for the visual modality, and $$f_{ms}^a$$

and $$f_{ma}^a$$

for the audio modality) and a predictor network ($h^v$ for the visual modality, and $h^a$ for the audio modality). FIG. 3 depicts, for the visual modality network 202, the first and second encoders 208*a,b*, the first, second, and fifth projectors 210*a,b,e*, and the first predictor 212*a*; and, the for audio modality network 204, the third and fourth encoders 208*c,d*, the third, fourth, and sixth projectors 210*c,d,f*, and the second predictor 212*b*. This allows the views $V_1$, $V_2$ to be processed in parallel and the views $A_1$. $A_2$ to be processed in parallel. However, as mentioned above the visual modality network 202 may comprise a single one of the first and second encoders 208*a,b* and a single one of the first and second projectors 210*a,b* if $V_1$ and $V_2$ are to be processed serially, while the audio modality network 204 may comprise a single one of the third and fourth encoders 208*c,d* and a single one of the third and fourth projectors 210*c,d* if $A_1$ and $A_2$ are to be processed serially.

3. In respect of the visual modality network 202, two randomly augmented views of the visual modality ($V_1$, $V_2$) are processed by the encoder $b^v$ and the modality-Special projector $$f_{ms}^v.$$

Then, predictor $h^v$ processes one of the outputs of $$f_{ms}^v,$$

i.e.

$$f_{ms}^v$$

$(b^v(V_1))$. The network 202 is trained to match $$z_{2v} = f_{ms}^v(b^v(V_2))$$

and $$P_{1v} = h^v(f_{ms}^v(b^v(V_1))).$$

The gradient is back-propagated only for $V_1$ and stop-gradient is applied for $V_2$. The negative cosine similarity loss is computed between $p_{1v}$ and $z_{2v}$ as follows and minimized:

$$D(p_{1v}, z_{2v}) = -\frac{p_{1v}}{\|p_{1v}\|_2} \cdot \frac{z_{2v}}{\|z_{2v}\|_2}, \tag{3}$$

where $\|\bullet\|_2$ refers to the $l_2$-norm. Stop-gradient is applied for $z_{2v}$, i.e., $D(p_{1v},\text{stopgrad}(z_{2v}))$. The symmetric loss for the visual modality network 202 is:

$$L_V = D(p_{1v},\text{stopgrad}(z_{2v})) + D(p_{2v},\text{stopgrad}(z_{1v})). \tag{4}$$

4. An analogous procedure as that enumerated in step 3 above is repeated for the audio modality network 204. Namely, the two randomly augmented views of the audio modality ($A_1$, $A_2$) are processed by the encoder $b^a$ and the modality-specific projector $$f_{ms}^a.$$

Finally, the predictor $h^a$ processes one of the outputs of $f_{ms}^a$, i.e., $f_{ms}^a(b^v(A_1))$.

The network 204 is trained to match $$p_{1a} = h^a(f_{ms}^a(b^a(A_1)))$$

and $$z_{2a} = f_{ms}^a(b^a(A_2)).$$

The gradient is back-propagated only for $A_1$ and stop-gradient is applied for $A_2$. The negative cosine similarity loss is computed between $p_{1a}$ and $z_{2a}$ as follows and minimized:

$$D(P_{1a}, z_{2a}) = -\frac{p_{1a}}{\|p_{1a}\|_2} \cdot \frac{z_{2a}}{\|z_{2a}\|_2}, \tag{5}$$

where $\|\bullet\|_2$ refers to the $l_2$-norm. Stop-gradient is applied for $l_2$, i.e., $D(p_{1a},\text{stopgrad}(z_{2a}))$. The symmetric loss for the audio modality network 204 is:

$$L_A = D(p_{1a},\text{stopgrad}(z_{2a})) + D(p_{2a},\text{stopgrad}(z_{1a})). \tag{6}$$

5. The encoder output of $V_2$, i.e., $b^v(V_2)$ is also processed by the modality-agnostic projector of the visual modality network 202, $$f_{ma}^v.$$

Similarly, the encoder output of $A_3$, i.e., $b^a(A_2)$ is processed by the modality-agnostic projector of the audio modality network 204

$$f_{ma}^a.$$

Let the output of $f_{ma}^v$ be $r_{2v} = f_{ma}^v(b^v(V_2))$ and the output of $f_{ma}^a$ be $r_{2a} = f_{ma}^a(b^a(A_2)).$ The negative similarity between $r_{2v}$ and $r_{2a}$ is defined as follows and minimized:

$$L_{VA} = D(r_{2v}, r_{2a}) = -\frac{r_{2v}}{\|r_{2v}\|_2} \cdot \frac{r_{2a}}{\|r_{2a}\|_2}, \tag{7}$$

where $\|\bullet\|_2$ refers to the $l_2$-norm. This loss is used to train the projectors $$f_{ma}^v$$

and $$f_{ma}^a.$$

The error from projectors $$f_{ma}^v$$

and $$f_{ma}^a$$

is not pack-propagated to the encoders, $b^v$ and $b^a$.

6. The final loss is computed as the weighted sum of $L_V$, $L_A$, and $L_{VA}$ as follows:

$$L = \lambda_1 \times L_V + \lambda_2 \times L_A + \lambda_3 \times L_{VA}, \qquad (8)$$

where $\lambda_1$, $\lambda_2$, and $\lambda_3$ are the scaling parameters.

R(2+1)D [3] and S3D-G [4] are used as the encoder (backbone) networks for the visual modality network 202, and ResNet [2] with 9 layers is used as the encoder (backbone) network for the audio modality network 204. The architecture of the projector and predictor networks is as defined in [1] for Projector1-V, Projector1-A, Predictor-V and Predictor-A. The projector1 (projector1-V and Projector1-A) network has three fully-connected layers, each with 2048 units, followed by batch normalization (BN) [5]. The first two layers have ReLU while the third layer has linear units. The Projector2 (Projector2-V and Projector2-A) network has five convolution layers followed by three fully-connected layers. The fully connected layers of Projector1-V and Projector2-V have weight sharing. Similarly, the fully connected layers of Projector1-A and Projector2-A have weight sharing. The prediction network has two fully-connected layers. The first layer has 512 ReLU units followed by BN. The second layer has 2048 linear units without any BN.

To generate the augmented views for the visual modality network 202, augmentations such as random cropping, random rotation, random colorization, temporal shifting, random masking, random shuffling may be used. To generate the augmented views for the audio modality network 204, augmentations such as additive white Gaussian noise, temporal shifting, random masking, random shuffling, adding random silences may be used.

FIG. 5 depicts an example method 500 for training a multi-modal artificial neural network, according to an example embodiment. The method 500 may be used to train one or both of the network 200 of FIG. 2 and the M3HN 300 of FIG. 3.

More particularly, the method 500 comprises, at block 502, processing, using a first modality simple Siamese network, a pair of first modality augmented views of an input. An example of the first modality simple Siamese network is the visual modality network 202 referenced above in FIGS. 2 and 3, and an example of the first modality augmented views of an input are $V_1$ and $V_2$.

At block 504, the method 500 comprises processing, using a second modality simple Siamese network, a pair of second modality augmented views of the input. An example of the second modality simple Siamese network is the audio modality network 204 referenced above in FIGS. 2 and 3, and an example of the second modality augmented views of an input are $A_1$ and $A_2$.

At block 506, the method 500 comprises determining at least one cross-modal loss between the first and second modality simple Siamese networks. In the network 200 of FIG. 2, the at least one cross-modal loss comprises the Sim-VA loss 206a and the Sim-AV loss 206b. In the M3HD 300 of FIG. 3, the at least one-cross modal loss comprises the Sim-VA loss 206a.

At block 508, the method 500 comprises determining a total loss from first and second modality losses respectively determined during the processing using the first and second modality simple Siamese networks; and the at least one cross-modal loss. For both the network 200 and M3HD 300, the first modality loss comprises the Sim Vis 214 loss and the second modality loss comprises the Sim Aud 216 loss. For the network 200, the total loss is as described in FIG. 2, and for the M3HN 300, the total loss is as described in respect of Equation (8).

And at block 510, the method comprises training the first and second simple Siamese networks based on the total loss. This is performed through the back propagation of the gradients and stop-gradients as described above.

Example Downstream Tasks

The M3HN 300 may be used in a variety of different downstream tasks. Examples of these different downstream tasks, and the associated pre-training, are provided below.

The M3HN 300 may be pre-trained, for example, using the Voxceleb2 dataset [6] as a pre-training dataset. The Voxceleb2 dataset contains 1.1M video clips collected from over 6000 celebrities, extracted from 150K unique videos uploaded to YouTube™. The average duration of the video clips is around 8 seconds. Pre-training may be performed using a subset of the video clips, such as video clips of at least 3 seconds in duration and consisting of valid visual and audio modalities; applying these criteria results in a total of 1M video clips to pre-train the M3HN 300. Prior to performing selected downstream tasks such as those described below, the M3HN 300 is pre-trained on the pre-training dataset, and is subsequently trained again on a training set specific to those downstream tasks.

The pre-trained M3HN 300 may be evaluated on a set of diverse downstream tasks related to affective video content analysis to test different aspects of the learned representations. The performance of the M3HN 300 may be compared with previous state-of-the-art (SOTA) multi-modal self-supervised techniques for videos, i.e., GDT [7], MWV [8] and networks pre-trained on only an audio modality (Q-wav2vec [9], MockingJay and Wav2vec 2.0 [11]) or a visual modality (I3D [12], R(2+1)D [3] and S3D-G [4]). Performance may be evaluated in terms of $F_1$ score, Accuracy (Acc.) and area under the curve (AUC). The performance of the M3HN 300, pre-trained on both visual and audio modalities, on individual modalities may be provided $b^v$ considering the output representation of the corresponding encoder. For the audio modality, the audio encoder $b^a$ of the M3HN 300 may be used and for the visual modality, the visual encoder $b^v$ of the M3HN 300 may be used.

One example downstream task is audio-visual emotion classification. The Ryerson Audio-Visual Database of Emotional Speech and Song (RAVDESS) dataset may be used for downstream task-specific training to test audio-visual emotion classification. This dataset consists of audio-visual data labelled with eight different emotions: anger, happiness, disgust, fear, surprise, sadness, calmness and neutral. This dataset consists a total of 2880 recordings.

Another example downstream task is audio-visual sentiment classification. In this regard, the performance of the networks may be fine-tuned for the task of audio-visual sentiment classification using the CMU Multi-modal Opinion Sentiment and Emotion Intensity (CMU-MOSEI) dataset [15]. CMU-MOSEI consists of 23453 video clips, collected from 3228 videos with 1000 distinct speakers, annotated with sentiment labels.

Another example downstream task is audio-visual sarcasm detection. In this regard, the Multi-modal Sarcasm Detection Dataset (MUStARD) [16], compiled from popular TV shows, may be used for downstream task-specific training. MUStARD consists of 690 audiovisual utterances annotated with sarcasm labels.

Another example downstream task is audio depression detection. For this, the DIAC-WOZ dataset may be used for downstream task-specific training. The DAIC-WoZ dataset contains a set of 189 clinical interviews. Each audio file may be labeled with a PHQ-8 (Patient Health Questionnaire) score which is in the range of 0-24 to denote the severity of depression. Audio files with PHQ-8 score of 10 or above are considered as depressed, and those with PHQ-8 score below 10 are considered as non-depressed.

Figure 4:
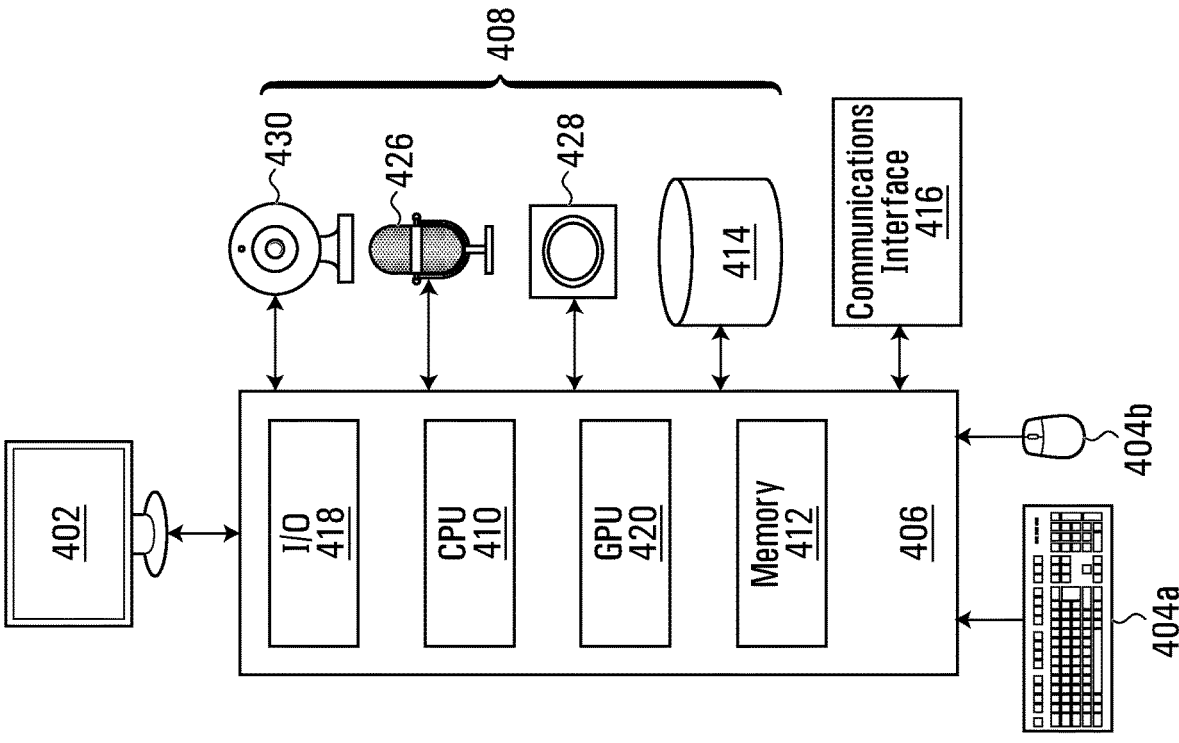
FIG. 4 depicts a computer system that may be used to implement the neural networks of FIGS. 2 and 3, according to an example embodiment.

An example computer system in respect of which the technology herein described may be implemented is presented as a block diagram in FIG. 4. The example computer system is denoted generally by reference numeral 400 and includes a display 402, input devices in the form of keyboard 404a and pointing device 404b, computer 406 and external devices 408. While pointing device 404b is depicted as a mouse, it will be appreciated that other types of pointing device, or a touch screen, may also be used.

The computer 406 may contain one or more processors or microprocessors, such as a central processing unit (CPU) 410. The CPU 410 performs arithmetic calculations and control functions to execute software stored in a non-transitory internal memory 412, preferably random access memory (RAM) and/or read only memory (ROM), and possibly additional memory 414. The additional memory 414 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 414 may be physically internal to the computer 406, or external as shown in FIG. 4, or both. The additional memory 414 may also comprise a database for storing training data to train the network 200 and/or M3HN 300, or that the network 200 and/or M3HN 300 can retrieve and use for inference after training. For example, the datasets used in the experiments described above may be stored in such a database and retrieved for use in training.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal and/or additional memory 414 for execution by the one or more processors or microprocessors to effect neural network pre-training, training, or use of a trained network for inference.

The computer system 400 may also include other similar means for allowing computer programs or other instructions to be loaded. Such means can include, for example, a communications interface 416 which allows software and data to be transferred between the computer system 400 and external systems and networks. Examples of communications interface 416 can include a modem, a network interface such as an Ethernet card, a wireless communication interface, or a serial or parallel communications port. Software and data transferred via communications interface 416 are in the form of signals which can be electronic, acoustic, electromagnetic, optical or other signals capable of being received by communications interface 416. Multiple interfaces, of course, can be provided on a single computer system 400.

Input and output to and from the computer 406 is administered by the input/output (I/O) interface 418. This I/O interface 418 administers control of the display 402, keyboard 404a, external devices 408 and other such components of the computer system 400. The computer 406 also includes a graphical processing unit (GPU) 420. The latter may also be used for computational purposes as an adjunct to, or instead of, the (CPU) 410, for mathematical calculations.

The external devices 408 include a microphone 426, a speaker 428 and a camera 430. Although shown as external devices, they may alternatively be built in as part of the hardware of the computer system 400. For example, the camera 430 and microphone 426 may be used to retrieve multi-modal video content for use to train the network 200 and/or M3HN 300, or for processing by a trained network 200 or trained M3HN 300.

The various components of the computer system 400 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards". "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

LIST OF REFERENCES

The following is a list of the references referred to above, each of which is hereby incorporated by reference.

[1] Xinlei Chen and Kaiming He. Exploring simple siamese representation learning. In *Proceedings of the IEEE/CVF Conference on Computer Vision and Pattern Recognition*, pages 15750-15758, 2021.

[2] Kaiming He, Xiangyu Zhang, Shaoqing Ren, and Jian Sun. Deep residual learning for image recognition. In *Proceedings of the IEEE conference on computer vision and pattern recognition*, pages 770-778, 2016.

[3] Du Tran, Heng Wang, Lorenzo Torresani, Jamie Ray, Yann LeCun, and Manohar Paluri. A closer look at spatiotemporal convolutions for action recognition. In *Proceedings of the IEEE conference on Computer Vision and Pattern Recognition*, pages 6450-6459, 2018.

[4] Saining Xie, Chen Sun, Jonathan Huang, Zhuowen Tu, and Kevin Murphy. Rethinking spatiotemporal feature learning: Speed-accuracy trade-offs in video classification. In *Proceedings of the European conference on computer vision (ECCV)*, pages 305-321, 2018.

[5] Sergey Ioffe and Christian Szegedy. Batch normalization: Accelerating deep network training by reducing internal covariate shift. In *International conference on machine learning*, pages 448-456. PMLR, 2015.

[6] Joon Son Chung, Arsha Nagrani, and Andrew Zisserman. Voxceleb2: Deep speaker recognition. arXiv preprint arXiv:1806.05622, 2018.

[7] Mandela Patrick, Yuki M Asano, Polina Kuznetsova, Ruth Fong, João F Henriques, Geoffrey Zweig, and Andrea Vedaldi. On compositions of transformations in contrastive self-supervised learning. In *Proceedings of the IEEE/CVF International Conference on Computer Vision*, pages 9577-9587, 2021.

[8] Jean-Baptiste Alayrac, Adria Recasens, Rosalia Schneider, Relja Arandjelovic, Jason Ramapuram, Jeffrey De Fauw, Lucas Smaira, Sander Dieleman, and Andrew Zisserman. Self-supervised multi-modal versatile networks. *NeurIPS*, 2 (6): 7, 2020.

[9] Alexei Baevski, Steffen Schneider, and Michael Auli. vq-wav2vec: Self-supervised learning of discrete speech representations. In *International Conference on Learning Representations*, 2019.

[10] Andy T Liu, Shu-wen Yang, Po-Han Chi, Po-chun Hsu, and Hung-yi Lee. Mockingjay: Unsupervised speech representation learning with deep bidirectional transformer encoders. In *ICASSP* 2020-2020 *IEEE International Conference on Acoustics, Speech and Signal Processing (ICASSP)*, pages 6419-6423. IEEE, 2020.

[11] Alexei Baevski, Yuhao Zhou, Abdelrahman Mohamed, and Michael Auli. wav2vec 2.0: A framework for self-supervised learning of speech representations. *Advances in Neural Information Processing Systems*, 34, 2020.

[12] Joao Carreira and Andrew Zisserman. Quo vadis, action recognition? a new model and the kinetics dataset. In *proceedings of the IEEE Conference on Computer Vision and Pattern Recognition*, pages 6299-6308, 2017.

[13] Steven R Livingstone and Frank A Russo. The ryerson audio-visual database of emotional speech and song (ravdess): A dynamic, multi-modal set of facial and vocal expressions in north american english. *PloS one,* 13 (5): e0196391, 2018.

[14] Humam Alwassel, Dhruv Mahajan, Bruno Korbar, Lorenzo Torresani, Bernard Ghanem, and Du Tran. Self-supervised learning by cross-modal audio-video clustering. In 34th *Conference on Neural Information Processing Systems (NeurIPS 2020)*. NeurIPS, 2020.

[15] AmirAli Bagher Zadeh, Paul Pu Liang, Soujanya Poria, Erik Cambria, and Louis-Philippe Morency. Multimodal language analysis in the wild: Cmu-mosei dataset and interpretable dynamic fusion graph. In *Proceedings of the 56th Annual Meeting of the Association for Computational Linguistics (Volume 1: Long Papers)*, pages 2236-2246, 2018.

[16] Santiago Castro, Devamanyu Hazarika, Verónica Pérez-Rosas, Roger Zimmermann, Rada Mihalcea, and Soujanya Poria. Towards multi-modal sarcasm detection (an _obviously_perfect paper). arXiv preprint arXiv: 1906.01815, 2019.

[17] Jonathan Gratch, Ron Artstein, Gale M Lucas, Giota Stratou, Stefan Scherer, Angela Nazarian, Rachel Wood, Jill Boberg, David DeVault, Stacy Marsella, et al. The distress analysis interview corpus of human and computer interviews. In *LREC*, pages 3123-3128, 2014.

The invention claimed is:

1. A self-supervised learning method comprising:
(a) processing, using a first modality simple Siamese network, a pair of first modality augmented views of an input;
(b) processing, using a second modality simple Siamese network, a pair of second modality augmented views of the input;

(c) determining at least one cross-modal loss between the first and second modality simple Siamese networks;

(d) determining a total loss from:

(i) first and second modality losses respectively determined during the processing using the first and second modality simple Siamese networks; and (ii) the at least one cross-modal loss; and (e) training the first and second modality simple Siamese networks based on the total loss, wherein determining the at least one cross-modal loss comprises determining a cross-modal loss based on:

an output of a modality-agnostic projector of the first modality simple Siamese network that processes one of the first modality augmented views; and an output of a modality-agnostic projector of the second modality simple Siamese network that processes one of the second modality augmented views, wherein the input comprises a video, the first modality comprises images from the video, and the second modality comprises audio from the video, and wherein a gradient is back propagated to each of the modality-agnostic projectors, and a stop-gradient is applied to respective encoders of the first and second Siamese networks, wherein the outputs of the encoders of the first and second Siamese networks are respectively input to the modality-agnostic projector of the first and second Siamese networks.

2. The method of claim 1, wherein predictors of the first and second modality simple Siamese networks share weights.

3. The method of claim 1, wherein the encoders of the first and second Siamese networks comprise second and third encoders, and wherein:

the first modality simple Siamese network comprises:

a first encoder and the second encoder that respectively process the pair of first modality augmented views; and a first modality-specific projector and a second modality-specific projector that respectively receive an output of the first encoder and the output of the second encoder:

the second modality simple Siamese network comprises:

the third encoder and a fourth encoder that respectively process the pair of second modality augmented views; and a third modality-specific projector and a fourth modality-specific projector that respectively receive the output of the third encoder and an output of the fourth encoder; and at least one of the i) first and second or ii) third and fourth modality-specific projectors share weights.

4. The method of claim 3, wherein the first and second encoders share weights, and the third and fourth encoders share weights.

5. The method of claim 3, wherein the first, second, third, and fourth modality-specific projectors share weights.

6. The method of claim 3, wherein the first modality-agnostic projector comprises a first network of convolutional layers whose output is input to a projector identical to the first or second modality-specific projector, and wherein the second modality-agnostic projector comprises a second network of convolutional layers whose output is input to a projector identical to the third or fourth modality-specific projector.

7. The method of claim 1, wherein the augmented views of the video are generated by performing at least one of random cropping, random rotation, random colorization, temporal shifting, random masking, or random shuffling.

8. The method of claim 1, wherein the augmented views of the audio are generated by performing at least one of adding additive white Gaussian noise, temporal shifting, random masking, random shuffling, or adding random silences.

9. An artificial neural network trained in accordance with a self-supervised learning method, the artificial neural network comprising first and second modality simple Siamese networks, the method comprising:

(a) processing, using the first modality simple Siamese network, a pair of first modality augmented views of an input;

(b) processing, using the second modality simple Siamese network, a pair of second modality augmented views of the input;

(c) determining at least one cross-modal loss between the first and second modality simple Siamese networks;

(d) determining a total loss from:

(i) first and second modality losses respectively determined during the processing using the first and second modality simple Siamese networks; and (ii) the at least one cross-modal loss; and (e) training the first and second modality simple Siamese networks based on the total loss, wherein determining the at least one cross-modal loss comprises determining a cross-modal loss based on:

an output of a modality-agnostic projector of the first modality simple Siamese network that processes one of the first modality augmented views; and an output of a modality-agnostic projector of the second modality simple Siamese network that processes one of the second modality augmented views, wherein the input comprises a video, the first modality comprises images from the video, and the second modality comprises audio from the video, and wherein a gradient is back propagated to each of the modality-agnostic projectors, and a stop-gradient is applied to respective encoders of the first and second Siamese networks, wherein the outputs of the encoders of the first and second Siamese networks are respectively input to the modality-agnostic projector of the first and second Siamese networks.

10. The artificial neural network of claim 9, wherein predictors of the first and second modality simple Siamese networks share weights.

11. The artificial neural network of claim 9, wherein the encoders of the first and second Siamese networks comprise second and third encoders, and wherein:

the first modality simple Siamese network comprises:

a first encoder and the second encoder that respectively process the pair of first modality augmented views; and a first modality-specific projector and a second modality-specific projector that respectively receive an output of the first encoder and the output of the second encoder;

the second modality simple Siamese network comprises:

the third encoder and a fourth encoder that respectively process the pair of second modality augmented views; and a third modality-specific projector and a fourth modality-specific projector that respectively receive the output of the third encoder and an output of the fourth encoder; and at least one of the i) first and second or ii) third and fourth modality-specific projectors share weights.

12. The artificial neural network of claim 11, wherein the first and second encoders share weights, and the third and fourth encoders share weights.

13. The artificial neural network of claim 11, wherein the first, second, third, and fourth modality-specific projectors share weights.

14. The artificial neural network of claim 11, wherein the first modality-agnostic projector comprises a first network of convolutional layers whose output is input to a projector identical to the first or second modality-specific projector, and wherein the second modality-agnostic projector comprises a second network of convolutional layers whose output is input to a projector identical to the third or fourth modality-specific projector.

15. The artificial neural network of claim 9, wherein the augmented views of the video are generated by performing at least one of random cropping, random rotation, random colorization, temporal shifting, random masking, or random shuffling.

16. The artificial neural network of claim 9, wherein the augmented views of the audio are generated by performing at least one of adding additive white Gaussian noise, temporal shifting, random masking, random shuffling, or adding random silences.

\* \* \* \* \*